(12) United States Patent
Lin et al.

(10) Patent No.: US 10,975,588 B2
(45) Date of Patent: Apr. 13, 2021

(54) INTEGRAL ROTARY TRANSPORT MECHANISM

(71) Applicant: Guangdong Weichuang Wuyang Intelligent Equipment Co., Ltd., Dongguan (CN)

(72) Inventors: Weitong Lin, Dongguan (CN); Yungao Hu, Dongguan (CN); Yongjin Guo, Dongguan (CN); Pin Cao, Dongguan (CN)

(73) Assignee: GUANGDONG WEICHUANG WUYANG INTELLIGENT EQUIPMENT CO., LTD., Dongguan (CN)

( * ) Notice: Subject to any disclaimer, the term of this patent is extended or adjusted under 35 U.S.C. 154(b) by 282 days.

(21) Appl. No.: 16/166,710

(22) Filed: Oct. 22, 2018

(65) Prior Publication Data

US 2019/0055748 A1 Feb. 21, 2019

(30) Foreign Application Priority Data

Feb. 1, 2018 (CN) .......................... 201810103431.9

(51) Int. Cl.
| | |
|---|---|
| *E04H 6/28* | (2006.01) |
| *E04H 6/42* | (2006.01) |
| *B60S 13/02* | (2006.01) |
| *E04H 6/32* | (2006.01) |
| *E04H 6/40* | (2006.01) |
| *E04H 6/24* | (2006.01) |

(52) U.S. Cl.
CPC .............. *E04H 6/285* (2013.01); *B60S 13/02* (2013.01); *E04H 6/424* (2013.01); *E04H 6/426* (2013.01); *E04H 6/245* (2013.01); *E04H 6/32* (2013.01); *E04H 6/40* (2013.01)

(58) Field of Classification Search
CPC ........ B61J 1/00; B61J 1/02; B61J 1/08; E04H 6/00; E04H 6/28; E04H 6/282; E04H 6/285

See application file for complete search history.

(56) References Cited

FOREIGN PATENT DOCUMENTS

WO WO-0034100 A1 * 6/2000 ............. E01B 25/12

* cited by examiner

*Primary Examiner* — Robert J McCarry, Jr.
(74) *Attorney, Agent, or Firm* — Shimokaji IP

(57) ABSTRACT

An integral rotary transport mechanism includes a turntable, a loading board, a lifting platform, two vehicle centering devices, a rotating device and two positioning members. A central portion of the turntable is provided with a first groove, by narrowing and extending which a second groove is formed. The lifting platform is liftable and can be lowered to a bottom of the second groove to form an activity space between the lifting platform and the loading board. The rotating device is disposed at a bottom of the turntable driven to be rotated 180 degrees. The vehicle centering device, through which cars can be accurately adjusted to middle of the loading board placed in the first groove, is disposed on the turntable and located at opposite sides of the loading board. The positioning member is disposed on the turntable and located at the other opposite sides of the loading board.

10 Claims, 5 Drawing Sheets

INTEGRAL ROTARY TRANSPORT MECHANISM

CROSS-REFERENCE TO RELATED APPLICATIONS

This application claims the benefits of Chinese Patent Application No. 201810103431.9, filed on Feb. 1, 2018, which is hereby incorporated by reference in this application.

FIELD OF THE INVENTION

The present invention relates to technical field of stereo garage, and more particularly, to an integral rotary transport mechanism.

BACKGROUND OF THE INVENTION

With the high development of city construction, the problem of lacking parking lots is particularly serious. The problem about parking difficulty is urgent to be solved. The space of stereo garage can be more fully utilized, thus it can save land resources and costs of land construction. The stereo garage is the mainstream trend about parking lots in the future. Cars need to be adjusted to the middle position after getting into the stereo garage for avoiding cars without being parked as required, which will cause a great accident during the car being handled. Once an accident is occurred, the parking equipment or the vehicle itself will suffer huge damage. In addition, cars need to be rotated 180 degrees for being picked up conveniently because the car enters and exits the stereo garage in different directions.

Therefore, there is a need for providing a liftable integral rotary transport mechanism capable of rotating overall and centering cars, to overcome the above-mentioned drawbacks.

SUMMARY OF THE INVENTION

In order to solve the above technical problems, a liftable integral rotary transport mechanism capable of rotating overall and centering the car is provided by the present invention.

To achieve the above-mentioned objectives, the integral rotary transport mechanism provided by the present invention comprises a turntable, a loading board, a lifting platform, two vehicle centering devices, a rotating device and two positioning members. A central portion of the turntable is provided with a first groove, a second groove is formed by narrowing and extending the first groove, the loading board is placed in the first groove, the lifting platform is arranged to be lifted or lowered in the second groove, the rotating device is arranged at a bottom of the turntable so as to drive the turntable, two vehicle centering devices are arranged on the turntable and located at opposite sides of the loading board, two positioning members are arranged on the turntable and located at the other opposite sides of the loading board.

Preferably, the integral rotary transport mechanism further comprises a lifting device disposed on the turntable. The lifting platform selectively reaches to the second groove by means of movements of the lifting device.

Preferably, the vehicle centering device is configured with two push rods which are slidable and separately configured at opposite sides of the turntable.

Preferably, the two push rods are driven synchronously and oppositely.

Preferably, two roller groups are symmetrically disposed on the loading board.

Preferably, a slide rail, on which a carrier is slid, is disposed on the lifting platform.

Preferably, the positioning members are arranged to be lifted or lowered on the turntable.

Preferably, the positioning member is provided with an inductive switch.

Preferably, the positioning member is cylindrical.

As compared with prior arts, the integral rotary transport mechanism provided by the present invention is provided with the lifting platform which is liftable and can be lowered to the bottom of the second groove to form an activity space between the lifting platform and the loading board for cars entering and exiting the integral rotary transport mechanism, the carrier can enter the lifting platform through the activity space. The turntable is rotated 180 degrees by the rotating device, thereby the integral rotary transport mechanism is rotated 180 degrees so that cars parked on the integral rotary transport mechanism are turned around and driven to leave easily. In addition, cars can be adjusted to the middle portion of the loading board by the vehicle centering devices so that cars are parked on the preset position accurately. Thereby an accident can be avoided.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
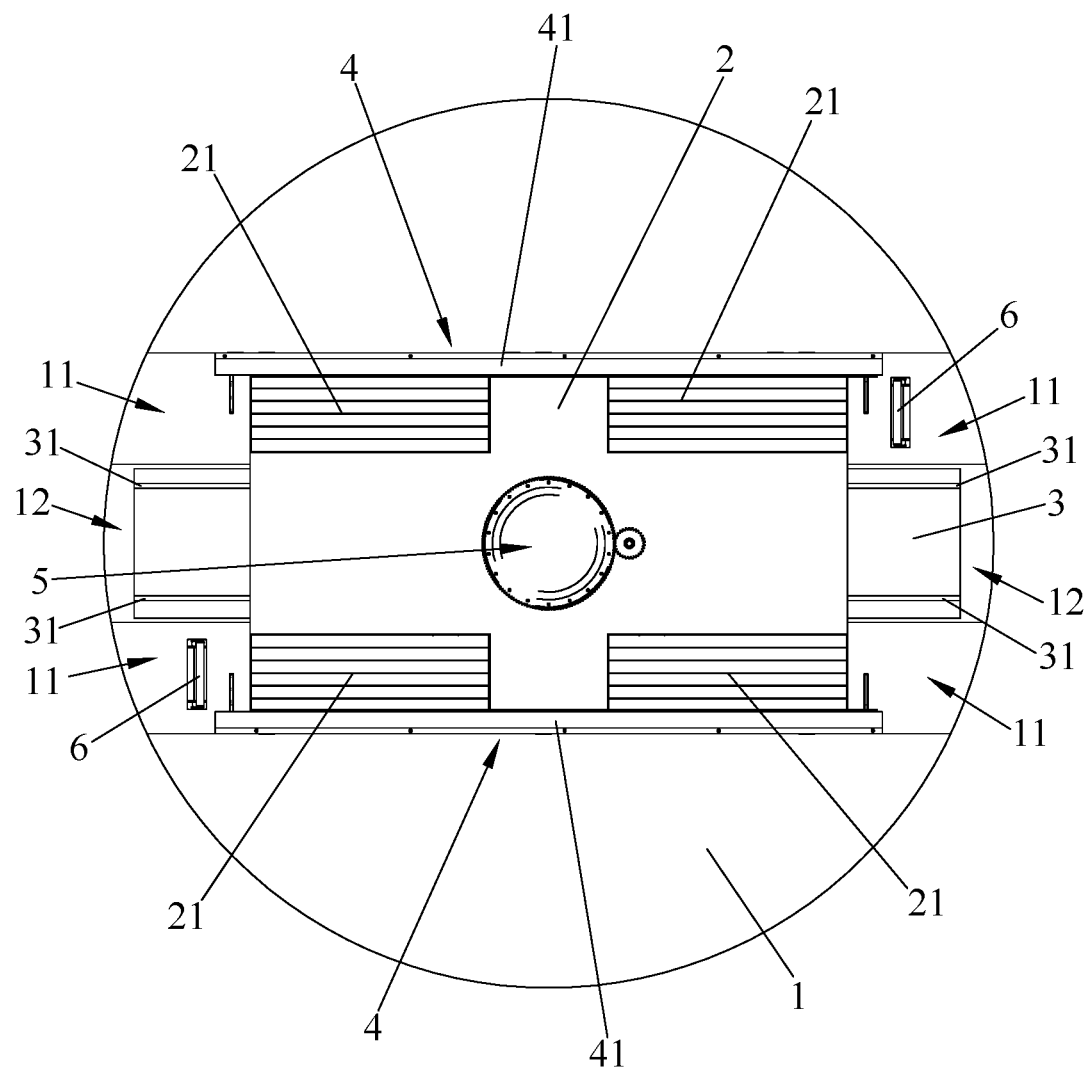
FIG. 1 is a plan view of an integral rotary transport mechanism according to one embodiment of the present invention.
Figure 2:
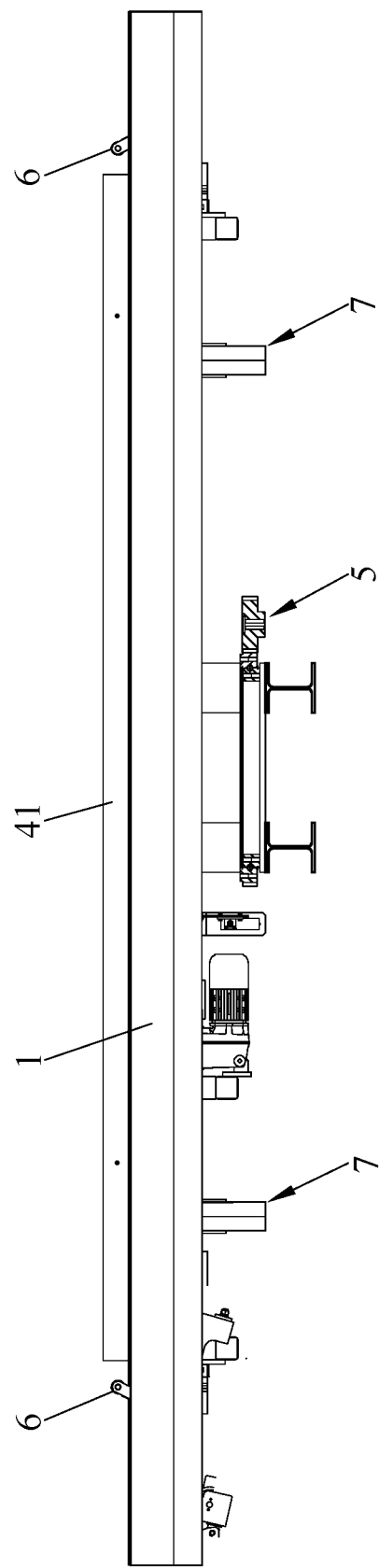
FIG. 2 is a front view of the integral rotary transport mechanism provided by the present invention.
Figure 3:
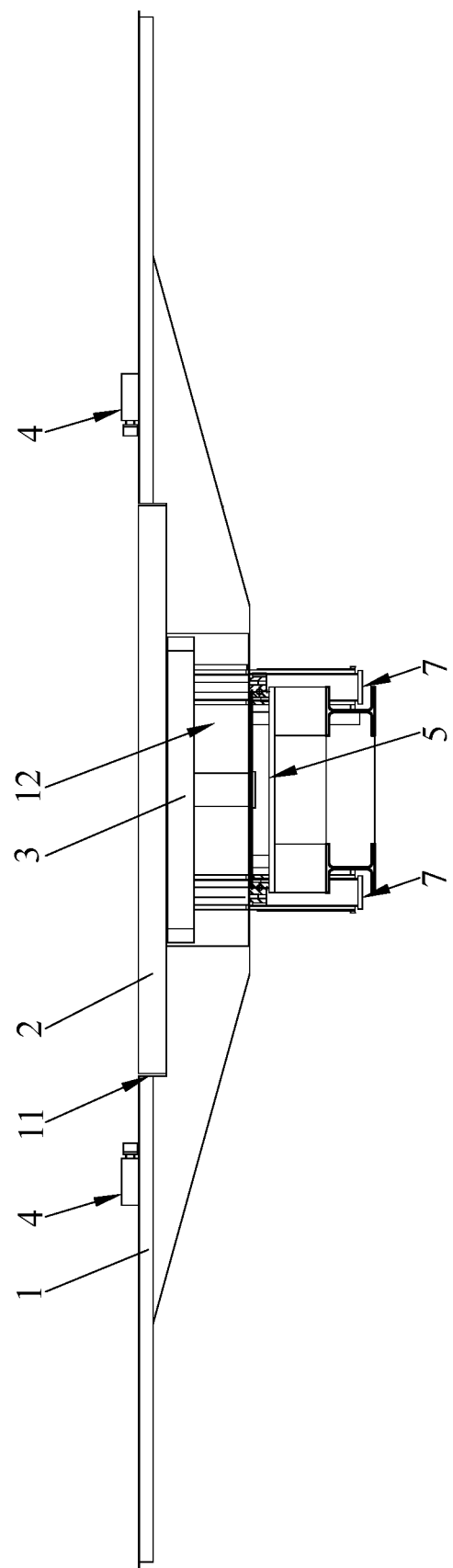
FIG. 3 is a left view of the integral rotary transport mechanism provided by the present invention.
Figure 4:
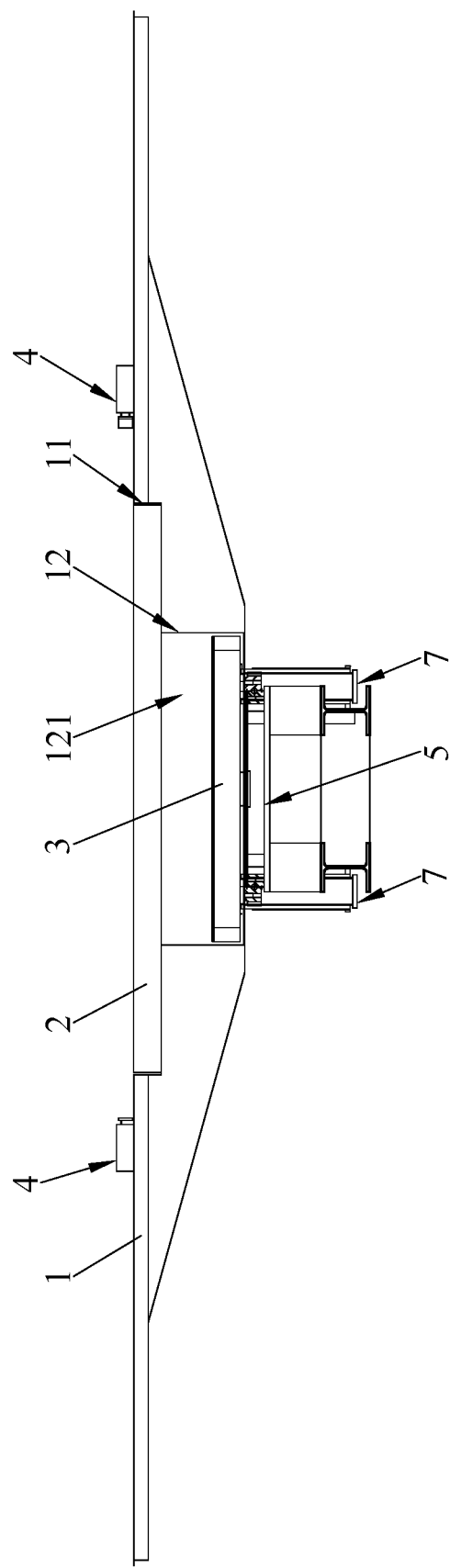
FIG. 4 is a schematic view showing the lifting platform of FIG. 3 downing to the bottom of the second groove.
Figure 5:
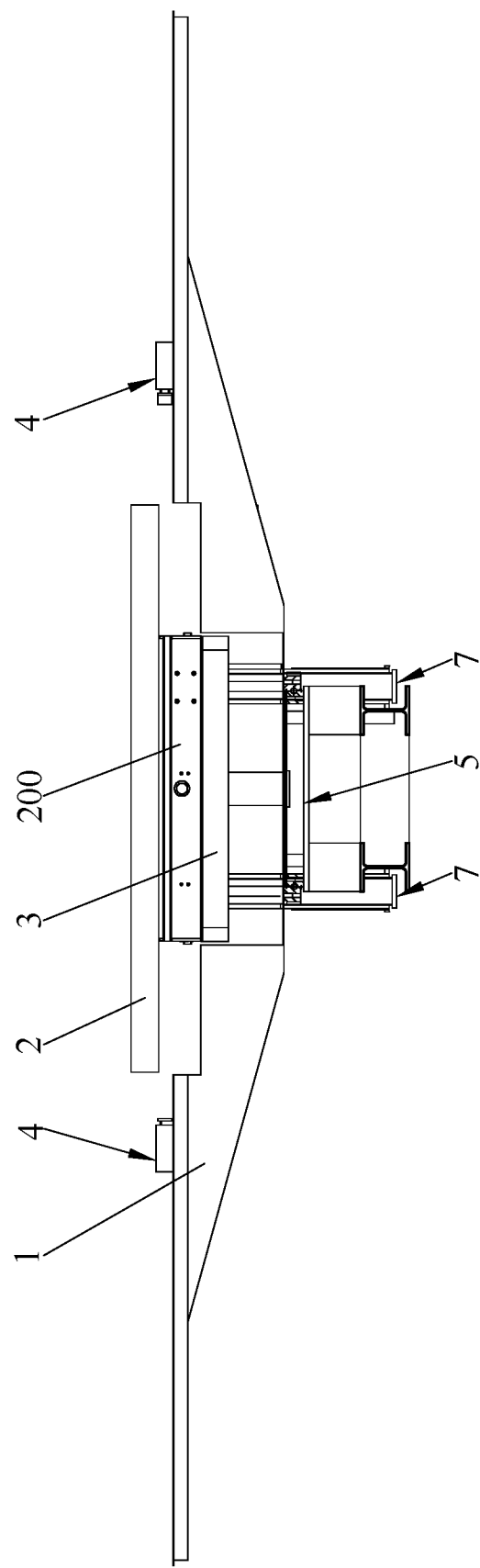
FIG. 5 is a schematic view showing the loading board being lifted by the carrier entered into the integral rotary transport mechanism provided by the present invention.

Detailed descriptions about the integral rotary transport mechanism provided by the present invention are shown below in conjunction with figures and embodiments:

Referring to FIGS. 1 to 3, the integral rotary transport mechanism 100 provided by the present invention includes a turntable 1, a loading board 2, a lifting platform 3, two vehicle centering devices 4, a rotating device 5 and two positioning members 6. A central portion of the turntable 1 is provided with a first groove 11, by narrowing and extending which a second groove 12 is formed. The loading board 2 is placed in the first groove 11 and the top surface of the loading board 2 is coplanar with the top surface of the turntable 1 in order to facilitate the vehicle to be driven to the loading board 2. The lifting platform 3 is arranged to be lifted or lowered in the second groove 12. Specifically, the turntable 1 is provided with a lifting device 7, by means of movements of which the lifting platform 3 is selectively reaches the second groove 12. Firstly, the loading board 2 is supported by the lifting platform 3, the turntable 1 is driven to be rotated by the rotating device 5 arranged at the bottom of the turntable 1 through a method in which the driven gear is driven to be rotated by the driving gear which is driven to be rotated by the motor, but not limited to this. In other embodiments, the turntable 1 can be driven by the rotating device 5 in other ways in the prior art. Two vehicle centering devices 4, by which cars will be adjusted to the middle portion of the loading board 2 to avoid cars being parked in the deviation from the preset parking position, is disposed on the turntable 1 and located at opposite sides of the loading board 2. Cars will be restricted and positioned on the loading board 2 by two positioning members 6 disposed on the turntable 1 and located at the other opposite sides of the loading board 2. For cars can enter or exit the integral rotary transport mechanism easily and not be obstructed by the positioning member 6, the positioning member 6 is arranged to be lifted or lowered on the turntable 1. After the car entering the integral rotary transport mechanism 100, the positioning member is raise so that the car is positioned on the loading board 2. However, when the car is moved to leave or enter the integral rotary transport mechanism 100, the positioning member 6 is lowered to avoid hindering the car. In this embodiment, there are two positioning members 6 which are cylindrical. However, the number and shape of the positioning members 6 are not limited thereto. In order to make the devices of the integral rotary transport mechanism 100 work together, at the same time to improve the work efficiency and the level of the automation, the positioning member 6 is provided with an inductive switch (not shown) through which the signal can be transmitted to the controller to control the positioning member 6 thus the positioning member 6 can be lifted or lowered.

More specifically, as shown in FIG. 1, two push rods 41 are disposed on the vehicle centering device 4 and slidably disposed on opposite sides of the turntable 1. In this embodiment, two push rods 41 are driven synchronously and oppositely, that is to say, two push rods 41 are slid in opposite directions separately. Cars which are parked not in the preset position will be moved to the middle position by two push rods 41 slid synchronously from the opposite sides of the loading board 2 to the middle position of the loading board 2. In other embodiments, when cars are parked not on the preset parking position and the parking position has been sensed, cars can be pushed to the middle position by the push rod 41 set on one side of the loading board 2, but not limited to this. In order to reduce the resistance when push rods 41 push the car and the damage to the car tire, roller groups 21 consisting of multiple rollers side by side are symmetrically disposed on the loading board 2. In addition, roller groups 21 are disposed approximately at the position where the car stays on the loading board 2. The number of the roller groups 21 may be four, two, or six, etc., but not limited to this. The lifting platform 3 is provided with a slide rail 31, on which the carrier 200 is slid, for the carrier 200 can enter the lifting platform 3.

Referring to FIGS. 1, 3 to 5, the working process about the integral rotary transport mechanism 100 is further described below:

When cars are stored, at the beginning, the loading board 2 is supported by the lifting platform 3, the car is positioned by one positioning member 6 raise disposed on one side of the loading board 2, the other positioning member 6 disposed on the other side of the loading board 2 is lowered for avoiding the car being obstructed when the car enters the loading board 2. The car is positioned on the loading board 2 by the positioning member 6 after entering the integral rotary transport mechanism 100. When the driver leaves the car, the inductive switch is triggered by the car and the positioning member 6 is lowered. Secondly, the push rods 41 disposed on two sides of the vehicle centering device 4 are slid synchronously to push the car to the middle position of the loading board 2, thus finish centering the car. The lifting platform 3 is driven by the lifting device 7 and lowered to the bottom of the second groove 12 to form an activity space 121 between the lifting platform 3 and the loading board 2. The carrier 200 enters the lifting platform 3 through the activity space 121. Then both the lifting platform 3 and the carrier 200 are driven by the lifting device 7 and lifted to a high position so that the loading board 2 is jacked up by the carrier 200. At last, both the car and the loading board 2 are carried by the carrier 200 and then leave from the integral rotary transport mechanism to the parking garage.

The following is the process when the car is picked up. Firstly, two positioning members 6 disposed on both sides of the loading board 2 are lowered to avoid hindering the car to be carried into the integral rotary transport mechanism 100. The lifting platform 3 is driven up to a high position by the lifting device 7. The loading board 2 is transported along with the vehicle by the carrier 200 into the integral rotary transport mechanism 100. The lifting platform 3 and the carrier 200 are driven by the lifting device 7 and lowered to the bottom of the second groove 12, during this process, the loading board 2 downs into the first groove 11. Then the rotating device 5 is rotated by 180 degrees and waits for the car being driven to leave. Therefore the car is no need to be turned around when driven to leave by the driver.

In summary, since the lifting platform 3 of the integral rotary transport mechanism 100 is liftable and can be lowered to the bottom of the second groove 12, the activity space 121 is formed between the lifting platform 3 and the loading board 2 to be in or out of the integral rotary transport mechanism 100. The carrier 200 can enter the lifting platform 3 through the active space 121. The turntable 1 can be rotated by 180 degrees by the rotating device 5, thus the integral rotary transport mechanism 100 is rotated 180 degrees so that the car parked on the integral rotary transport mechanism 100 can be turned around and driven to leave easily. The car can be moved to the middle portion of the loading board 2 through vehicle centering devices 4, thereby the car is centered so that the accident is avoid caused by parking cars not in the preset position.

Many other changes and modifications can be made without departing from the conception and range provided by the present invention. It should be understood that, the present invention is not limited to any particular embodiment, and the range provided by the present invention is defined in the annexed claims.

What is claimed is:

1. An integral rotary transport mechanism, comprising a turntable, a loading board, a lifting platform, two vehicle centering devices, a rotating device and two positioning members, wherein a central portion of the turntable is provided with a first groove, a second groove is formed by narrowing and extending the first groove, the loading board is placed in the first groove, the lifting platform is arranged to be lifted or lowered in the second groove, the rotating device is arranged at a bottom of the turntable so as to drive the turntable, the two vehicle centering devices are arranged on the turntable and located at opposite sides of the loading board, the two positioning members are arranged on the turntable and located at the other opposite sides of the loading board, wherein the vehicle centering device is configured with two push rods which are slidable and separately configured at opposite sides of the turntable.

2. The integral rotary transport mechanism as claimed in claim 1, further comprising a lifting device disposed on the turntable, wherein the lifting platform selectively reaches to the second groove by means of movements of the lifting device.

3. The integral rotary transport mechanism as claimed in claim 1, wherein the two push rods are driven synchronously and oppositely.

4. The integral rotary transport mechanism as claimed in claim 1, wherein two roller groups are symmetrically disposed on the loading board.

5. The integral rotary transport mechanism as claimed in claim 1, wherein a slide rail, on which a carrier is slid, is disposed on the lifting platform.

6. The integral rotary transport mechanism as claimed in claim 1, wherein the positioning members are arranged to be lifted or lowered on the turntable.

7. The integral rotary transport mechanism as claimed in claim 1, wherein the positioning member is provided with an inductive switch.

8. The integral rotary transport mechanism as claimed in claim 1, wherein the positioning member is cylindrical.

9. An integral rotary transport mechanism, comprising a turntable, a loading board, a lifting platform, two vehicle centering devices, a rotating device and two positioning members, wherein a central portion of the turntable is provided with a first groove, a second groove is formed by narrowing and extending the first groove, the loading board is placed in the first groove, the lifting platform is arranged to be lifted or lowered in the second groove, the rotating device is arranged at a bottom of the turntable so as to drive the turntable, the two vehicle centering devices are arranged on the turntable and located at opposite sides of the loading board, the two positioning members are arranged on the turntable and located at the other opposite sides of the loading board, wherein two roller groups are symmetrically disposed on the loading board.

10. An integral rotary transport mechanism, comprising a turntable, a loading board, a lifting platform, two vehicle centering devices, a rotating device and two positioning members, wherein a central portion of the turntable is provided with a first groove, a second groove is formed by narrowing and extending the first groove, the loading board is placed in the first groove, the lifting platform is arranged to be lifted or lowered in the second groove, the rotating device is arranged at a bottom of the turntable so as to drive the turntable, the two vehicle centering devices are arranged on the turntable and located at opposite sides of the loading board, the two positioning members are arranged on the turntable and located at the other opposite sides of the loading board, wherein the positioning member is provided with an inductive switch.

* * * * *